June 7, 1955 J. A. DOREMUS ET AL 2,710,378
FREQUENCY MODULATION SYSTEM
Filed April 28, 1951
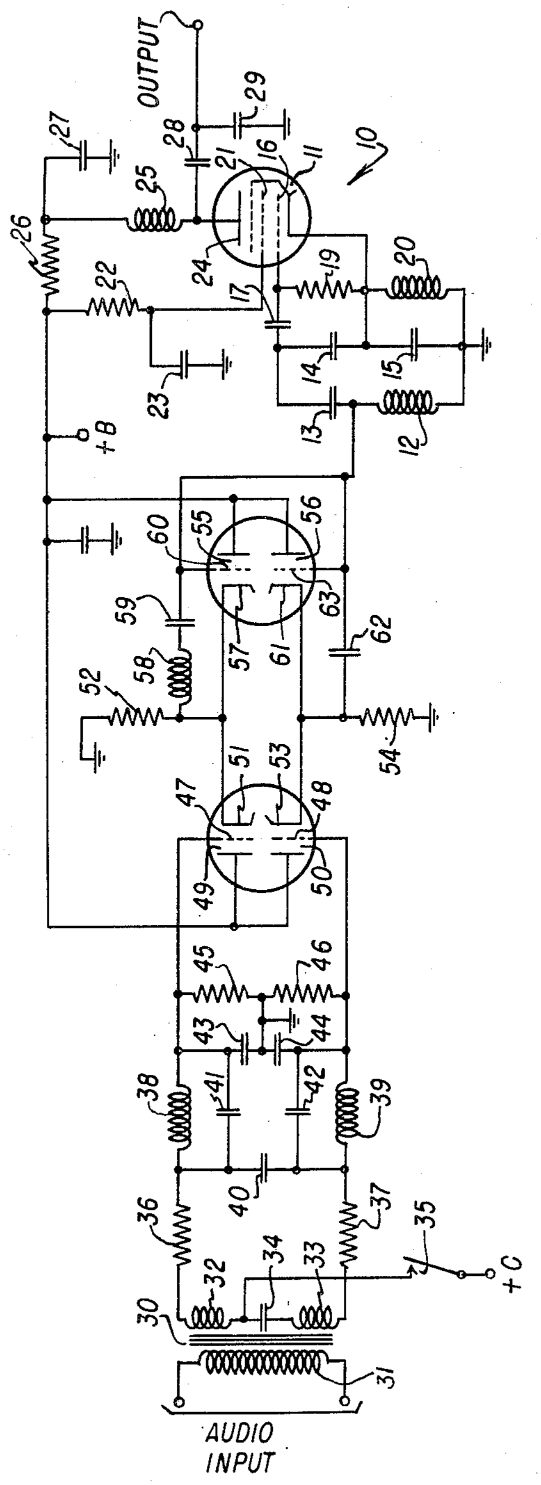
INVENTOR.
John A. Doremus
Robert P. Crow
BY
Zoorman L. Mueller
Atty.

United States Patent Office 2,710,378

Patented June 7, 1955

2,710,378

FREQUENCY MODULATION SYSTEM

John A. Doremus and Robert P. Crow, Chicago, Ill., assignors to Motorola, Inc., Chicago, Ill., a corporation of Illinois Application April 28, 1951, Serial No. 223,612

8 Claims. (Cl. 332—24)

This invention relates generally to modulation systems and more particularly to frequency modulation systems of the push-pull balanced type.

In frequency modulation systems, one of the basic problems has been to produce a large phase shift of the carrier wave by use of simple and inexpensive circuits. It is, of course, further required that the circuits used provide good center frequency stability. It has been proposed to use push-pull modulation systems to thereby increase the phase shift, but for satisfactory operations of such systems it is necessary that the sections in push-pull remain accurately balanced. This requires careful design and construction of the equipment originally, and requires very careful maintenance since the aging of components tends to cause an unbalance of the push-pull system which results in distortion in the output thereof. One of the problems causing the most difficulty has been that the tubes used may change characteristics substantially with age.

It is, therefore, an object of the present invention to provide an improved stable balanced modulator which provides wide deviation of the frequency modulated wave.

It is another object of the invention to provide a degenerative frequency modulation system in which unbalance resulting from variations in supply voltages and from aging of the components is minimized.

It is a further object of this invention to provide a simple modulation system for controlling the frequency of an oscillator, which reflects a phase shift into the tuned circuit of the oscillator to modulate the output thereof in response to a modulating wave, or to shift the frequency of the oscillator in response to the application of a direct current potential.

A feature of this invention is the provision of a balanced modulating system, wherein tube sections enclosed in the same envelope are used in corresponding positions in the two sides of the system to hold the system balanced.

Another feature of this invention is the provision of a modulating system in which a pair of triode sections included in a single envelope operate as a push-pull amplifier, and a second pair of triode sections included in a single envelope operate as a balanced modulator to provide wide phase shifts for causing variations in the frequency of an oscillator.

A further feature of this invention is the provision of a modulator for the frequency modulation system including a push-pull input circuit to which either an audio modulating wave or a direct current bias may be applied, and which includes balanced reactance sections coupled to the frequency controlling circuit of an oscillator for reflecting phase shifts thereto so that the oscillator produces a wave modulated in response to the audio signal, or shifted in frequency in response to the bias voltage.

Further objects and features, and the attending advantages of the invention will be apparent from a consideration of the following description when taken in connection with the accompanying drawing which is a circuit diagram of a modulating system in accordance with the invention.

In practicing the invention there is provided a modulating system including an oscillator having a tuned circuit for controlling the frequency of oscillations thereof. The modulator includes balanced reactance circuits, one being capacitive and the other being inductive which operate in push-pull to reflect phase shifts into the tuned circuit. The reactance circuits are individually connected to triode sections which are included in a single envelope. These triode sections are individually connected to triode amplifier sections, also included in a single envelope, and which function as cathode followers to apply the modulation signals to the cathodes of the reactance sections. Modulating signals are applied to the grids of the amplifier sections by an input circuit including a transformer having a primary winding for receiving audio signals and a pair of secondary windings providing push-pull voltages for the grids of the amplifier sections. Provisions are also included for applying a direct current bias to the input circuit, which is applied through the amplifier to the reactance circuit to cause a steady shift in the frequency of the oscillator. The modulator can, therefore, be used for either frequency modulation of the carrier wave, or for providing a fixed frequency shift of the carrier wave.

Referring now to the drawing, there is shown an oscillator 10 which is generally of the Colpitts type. It is to be pointed out, however, that the invention is not limited to a specific type of oscillator. The oscillator includes a pentode type tube 11 and a tuned circuit for controlling oscillations therein. The tuned circuit includes inductor 12 and capacitors 13, 14 and 15. The tuned circuit is coupled to the grid 16 of the pentode tube through the capacitor 17, with the grid being biased with respect to the cathode 18 by resistor 19. A choke 20 is bridged across the capacitor 15. The screen grid 21 of the tube is connected to B plus through resistor 22, with condenser 23 providing radio frequency bypass. The plate 24 is connected to plus B through inductor 25 and resistor 26 connected in series with condenser 27 providing the radio frequency bypass. The output from the oscillator is obtained from the plate 24 through condenser 28 and is developed across condenser 29.

The oscillator frequency is modulated by a system coupled to the tuned circuit of the oscillator for reflecting a phase shift thereto. This system includes an input transformer 30 having a primary winding 31 to which a modulating signal such as an audio wave may be applied. The transformer has a pair of secondary windings 32 and 33 for providing a push-pull output. The windings 32 and 33 are interconnected by a capacitor 34, with the intermediate end of winding 32 being connected to a switch 35 which is in turn connected to a source of positive potential. By use of the switch 35, a positive potential may be applied to the secondary winding 32. In order to limit the modulating frequency of the system, the signal from the secondary windings 32 and 33 may be applied through an audio filter network including resistors 36 and 37, inductors 38 and 39, and capacitors 40, 41, 42, 43 and 44. The filter network may limit the modulating signal frequency to any desired value depending upon the constants thereof. The signal from the network is applied across resistors 45 and 46 and also to the grids 47 and 48 of the triode sections 49 and 50. The triode sections 49 and 50 are included in a single envelope and operate as cathode follower stages, with the plates thereof being connected to plus B. The cathode 51 of the triode 49 is connected to resistor 52, and the cathode 53 of the triode 50 is connected to resistor 54. It is therefore apparent that the signal applied to the system is developed across the resistors 52 and 53 as balanced push-pull voltages.

For utilizing the voltages across resistors 52 and 53 for controlling the frequency characteristic of the tuned circuit of the amplifier, a pair of balanced reactance stages are provided including the triode sections 55 and 56, which are also included in a single envelope. The cathode 57 of the section 55 is connected to resistor 52, and a reactive circuit including inductor 58 and capacitor 59 is connected between the cathode 57 and the grid 60 of the triode section 55. Similarly, the cathode 61 of the triode section 56 is connected to the resistor 54, and a reactive circuit including capacitor 62 is connected between the cathode 61 and the grid 63. The voltages across the resistors 52 and 54 will control the phase shift across the reactive circuits which are in series with the resistors. As these voltages are equal and opposite, and the reactance circuits are of opposite type, the phase shifts across the circuits will be the same and will be additive.

More specifically, the reactance circuit including inductance 58 and capacitor 59 is predominantly inductive and therefore an increase in the voltage across the resistor 52 will cause a decrease in the effective inductive reactance of this circuit. At this same time the voltage across the resistor 54 will decrease resulting in an increase in the effective capacitive reactance of the capacitor 62. These two results are effectively the same and therefore the grids 60 and 63 may be directly connected together and to the reactance 12. The increase in the effective inductance will provide a leading phase shift to the tuned circuit of the oscillator causing the oscillator to raise its frequency. Conversely when the voltage across resistor 52 is a minimum and the voltage across resistor 54 is a maximum, the phase shift will be such that the oscillator frequency will be lowered. The following values have been used for the various components in the reactance modulator circuit in a system which has provided highly stable operation at 455 kilocycles with a deviation of ±3 kilocycles. It is to be pointed out, however, that these values are merely illustrative and various other values may be suitable for other applications. The values would, of course, be different for operation at a different frequency, and by changing the values greater deviation may be provided.

| | | |
|---|---|---|
| Tube **11** | | 6BJ6 |
| Inductor **12** | millihenrys | .1 to .2 |
| Capacitor **13** | micromicrofarads | 1080 |
| Capacitor **14** | microfarads | .003 |
| Capacitor **15** | do | .003 |
| Capacitor **17** | micromicrofarads | 100 |
| Resistor **19** | ohms | 47,000 |
| Choke **20** | millihenrys | 20 |
| Tube including triodes **49** and **50** | | 12AU7 |
| Tube including triodes **55** and **56** | | 12AU7 |
| Resistor **52** | ohms | 3,300 |
| Resistor **53** | do | 3,300 |
| Triodes **55** and **56** | | 12AU7 |
| Inductor **58** | millihenrys | 1.35 |
| Capacitor **59** | microfarads | .01 |
| Capacitor **62** | micromicrofarads | 82 |

The circuit which has been described is effective to produce very large phase shifts to thereby provide wide deviations of the center frequency of the oscillator. Larger or smaller deviations may be had, for a given modulating voltage and operating frequency, by changing resistors 52 and 53, capacitor 62 and inductor 58. The center frequency stabiilty of an oscillator-modulator, in general, varies inversely with the modulator sensitivity. That is, a reactance modulator which has high modulation sensitivity will generally be subject to variations in the center frequency. The system in accordance with the invention, however is highly sensitive and still provides good stability. The values specified in the example above result in a system having very good center frequency stability, and wider deviation can be obtained if the stability requirements of the system are not so rigid.

The system has been found to be very stable, first because the system is basically degenerative and therefore changes in B plus voltage and changes in the characteristics of the tubes will have little effect. A second factor which contributes to the stable operation is that the voltages produced throughout the push-pull system are very accurately balanced because the tubes are used in such a way that triode sections within the same envelope are placed in corresponding positions in the balanced circuit. This is particularly important in systems of this type since the phase shift is relatively critical and depends to a large degree upon the transconductance of the tubes. It has been found that the characteristics of triodes in the same envelope are closely related and changes in one tend to be accompanied by changes in the other. Also, when one tube section is replaced, the other tube section will necessarily be replaced at the same time. Therefore, by the use of two triode sections in the same envelope as the cathode followers, and by the use of two triode sections in the same envelope in the reactance circuit, changes in the tube characteristics will tend to correspond and the effect thereof will be balanced out in the system described.

As previously stated, the system may be used to provide frequency modulation of the carrier wave in accordance with an impressed audio signal or other modulating signal, and may also provide a steady shift in the oscillator frequency which may be keyed to provide frequency shift transmission. As relatively great changes in frequency may be provided by relatively simple equipment, the system may find application in various types of equipment.

Although a single embodiment of the invention has been described which is illustrative thereof, it is obvious that various changes and modifications can be made therein without departing from the intended scope of the invention as defined in the appended claims.

We claim:

1. A modulation system including in combination, a push-pull input circuit, first and second electron discharge valves each including a pair of triode sections, an oscillator having a tuned circuit, a pair of reactance means one of which is capacitive and the other of which is inductive, a pair of cathode follower circuits each including one of said triode sections of said first valve and a resistor connected to the cathode thereof, said grids of said triode sections being connected to said push-pull input circuit so that balanced push-pull voltages are developed across said resistors, a pair of variable reactance circuits each including one of said triode sections of said second valve and one of said reactance means, said triode sections of said second valve having the cathodes thereof individually connected to said cathodes of said triode sections of said first valve, and said reactance means being individually connected between said cathodes and said grids of said triode sections, and means coupling said reactance means to said tuned circuit for reflecting the phase shift thereacross to said tuned circuit for controlling the frequency of said oscillator, with the phase shifts across said reactance means being balanced and being additive to provide a substantial shift of the frequency of said oscillator.

2. A modulation system including in combination, a push-pull input circuit, first and second electron discharge valves each including a pair of triode sections, an oscillator having a tuned circuit, a pair of reactance means one of which is capacitive and the other of which is inductive, a pair of cathode follower circuits each including one of said triode sections of said first valve and a resistor connected to the cathode thereof, said grids of said triode sections being connected to said push-pull input circuit so that balanced push-pull voltages are developed across said resistors, said input circuit including means for applying a low frequency modulating wave and a direct current bias to said grids, a pair of variable reactance circuits each including one of said triode sections of said second valve and one of said reactance means, said triode sections of said second valve having the cathodes thereof individually connected to said cathodes of said triode sections of said first valve, and said reactance means being individually connected between said cathodes and said grids of said triode sections of said second valve, and means coupling said reactance means to said tuned circuit of said oscillator with said reactance means operating in push-pull to modulate the frequency of said oscillator in accordance with a modulating wave applied to said grids of said triode sections of said first valve, and for shifting the frequency of said oscillator in response to the application of a direct current bias to the grids of said triode sections of said first valve.

3. A modulation system including in combination, a push-pull input circuit, first and second electron discharge valves each including a pair of triode sections, an oscillator having a tuned circuit, first and second reactance means one of which is capacitive and the other of which is inductive, a pair of cathode follower circuits each including one of said triode sections of said first valve and a resistor connected to the cathode thereof, said grids of said triode sections being connected to said push-pull input circuit so that balanced push-pull voltages are developed across said resistors, said input circuit including means for applying a low frequency modulating wave and a direct current bias to said grids, a pair of variable reactance circuits each including one of said triode sections of said second valve and one of said reactance means, said triode sections of said second valve having the cathodes thereof individually connected to said cathodes of said triode sections of said first valve, and said reactance means being individually connected between said cathodes and said grids of said triode sections of said second valve so that the phase shift thereacross varies with the voltage across said resistors, and means coupling said first and second reactance means to said tuned circuit of said oscillator, the phase shifts across said first and second reactance means being substantially of the same magnitude and in the same sense and being reflected to said tuned circuit to change the frequency of said oscillator in response to the signal applied to said grids of said triode sections of said first valve.

4. A modulation system including in combination, a push-pull input circuit, a pair of electron discharge valves each having a cathode, a control grid, and an anode, an oscillator having a frequency controlling circuit, a pair of resistors, a pair of reactance means one of which is capacitive and the other of which is inductive, a source of potential connected to said anodes of said valves, said input circuit including means connected to said resistors for applying balanced push-pull voltages thereto, said resistors being individually connected to said cathodes of said valves, said reactance means being individually connected between said cathodes and said control grids of said valves so that the phase shifts provided thereby vary with the voltages across said resistors, and means coupling said reactance means to said frequency controlling circuit of said oscillator so that said phase shifts are reflected to said frequency controlling circuit to thereby change the frequency of said oscillator, the effect of said phase shifts being additive to provide a substantial change of the frequency of said oscillator.

5. A modulation system including in combination, an input circuit, including means for providing a low frequency modulating wave and a direct current bias, first and second electron discharge valves each having at least a cathode, a control grid and an anode, an oscillator having a tuned circuit, reactance means, a cathode follower circuit including said first electron discharge valve and a resistor connected to the cathode thereof, said grid of said first valve being connected to said input circuit so that a voltage is developed across said resistor which varies in accordance with the signal from said input circuit, a variable reactance circuit including said second valve and said reactance means, said second valve having the cathode thereof connected to said cathode of said first valve with said reactance means connected between said cathode and said grid of said second valve, and means coupling said reactance means to said tuned circuit of said oscillator so that the phase shift across said reactance means is reflected to said tuned circuit, for modulating the frequency of said oscillator in accordance with a modulating wave applied to said grid of said first valve, and for shifting the frequency of said oscillator in response to the application of a direct current bias to the grid of said first valve.

6. A frequency modulation system including in combination, a push-pull input circuit including first and second resistance means across which balanced voltages are developed, first and second triode electron discharge valves included in a single envelope and each having a cathode, a control grid and an anode, a resonant circuit, a first capacitive reactance means, a second inductive reactance means, means connected to said anodes of said valves for applying a positive potential thereto, means connecting said resistor means individually to said cathodes of said valves, means connecting said first and second reactance means individually between said cathode and said control grid of said first and second valves respectively so that the phase shifts provided by said reactance means vary with the voltages developed across said resistor means, and means coupling said reactance means to said resonant circuit so that said phase shifts are reflected to said resonant circuit to thereby change the resonant frequency thereof, with the phase shift produced by said first and second valves being additive to provide a large change of the frequency of said resonant circuit.

7. A frequency modulation system including in combination, a push-pull input circuit including first and second cathode follower portions each having resistance means across which balanced voltages are developed, an electron discharge valve including first and second triode sections each having a cathode, a control grid and an anode, a resonant circuit, a first reactance means which is capacitive and a second reactance means which is inductive, means connected to said anodes of said valves for applying a positive potential thereto, means connecting said resistor means individually between said cathodes of said valves and a reference potential, means connecting said first and second reactance means individually between said cathode and said control grid of said first and second triode sections respectively so that the phase shifts provided by said reactance means vary with the voltages developed across said resistor means, and means coupling said first and second reactance means to said resonant circuit so that said phase shifts are reflected to said resonant circuit to thereby change the resonant frequency thereof, with the phase shift produced by said first and second reactance means being additive to provide a large change in the frequency of said resonant circuit.

8. A modulation system including in combination, an input circuit adapted to receive a modulating signal, first and second electron discharge valves each having at least a cathode, a control grid and an anode, a tuned resonant circuit, reactance means, a cathode follower circuit including said first electron discharge valve and a resistor connected to the cathode thereof, said grid of said first valve being connected to said input circuit so that a voltage is developed across said resistor which varies in accordance with the signal from said input circuit, a variable reactance circuit including said second valve and said reactance means, said cathode of said second valve being connected to said cathode of said first valve, said reactance means being connected between said cathode and said grid of said second valve, and means coupling said reactance means to said tuned resonant circuit so that the phase shift across said reactance means is reflected to said resonant circuit for changing the frequency thereof in accordance with the signal from said input circuit.

References Cited in the file of this patent

UNITED STATES PATENTS

| | | |
|---|---|---|
| 2,296,630 | Crosby | Sept. 22, 1942 |
| 2,296,962 | Tunick | Sept. 29, 1942 |
| 2,323,598 | Hathaway | July 6, 1943 |
| 2,349,811 | Crosby | May 30, 1944 |
| 2,502,557 | Cooper | Apr. 4, 1950 |